United States Patent [19]

Abe et al.

[11] Patent Number: 4,684,684
[45] Date of Patent: Aug. 4, 1987

[54] THERMOPLASTIC RESIN COMPOSITION HAVING IMPROVED MOLDABILITY COMPRISING HOMOGENEOUS BLENDS OF THE RESIN WITH DIAMIDES

[75] Inventors: Katsuhiro Abe; Yoshinobu Kobayashi; Mitsushige Baba, all of Mie, Japan

[73] Assignee: Mitsubishi Petrochemical Co., Ltd., Tokyo, Japan

[21] Appl. No.: 709,206

[22] Filed: Mar. 7, 1985

[30] Foreign Application Priority Data

Mar. 15, 1984 [JP] Japan .................. 59-49571

[51] Int. Cl.$^4$ ............................... C08K 5/20
[52] U.S. Cl. .................. 524/227; 524/228; 524/229; 524/288
[58] Field of Search ................ 524/227, 228, 229, 288

[56] References Cited

U.S. PATENT DOCUMENTS

| | | | |
|---|---|---|---|
| 2,645,631 | 7/1953 | Crouch et al. | 524/745 |
| 2,758,982 | 8/1956 | Wicklatz et al. | 524/227 |
| 2,991,265 | 7/1961 | Clark et al. | 524/229 |
| 3,660,557 | 5/1972 | Smith et al. | 524/227 |
| 3,821,179 | 6/1974 | Powell | 524/229 |
| 3,887,754 | 6/1975 | Walter | 521/94 |
| 3,954,629 | 5/1976 | Scheffel et al. | 524/228 |
| 4,530,952 | 7/1985 | Tayama et al. | 524/611 |

FOREIGN PATENT DOCUMENTS 0083048  5/1983  Japan .................. 524/227

*Primary Examiner*—Herbert J. Lilling
*Attorney, Agent, or Firm*—Oblon, Fisher, Spivak, McClelland & Maier

[57] ABSTRACT

A composition comprising an amorphous resin (excluding polyphenylene ether) and a specific diamide compound of the formula

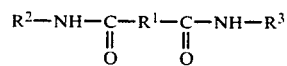

wherein $R^1$, $R^2$ and $R^3$ are defined in the specification. The moldability of the amorphous resin is improved without reducing its heat resistance.

17 Claims, No Drawings

THERMOPLASTIC RESIN COMPOSITION HAVING IMPROVED MOLDABILITY COMPRISING HOMOGENEOUS BLENDS OF THE RESIN WITH DIAMIDES

FIELD OF THE INVENTION

The present invention relates to an amorphous thermoplastic resin composition having improved moldability.

BACKGROUND OF THE INVENTION

Amorphous thermoplastic resins are characterized by the fact that they can be molded by heating to a temperature above the glass transition temperature, thereby reducing their viscosity. It is greatly due to their good moldability that these amorphous thermoplastic resins have gained more and wider usages as compared to thermosetting resins.

In recent years, however, the market demanded better moldability of thermoplastic resins, and the improvement of their moldability has been an important problem in the art.

In particular, ABS resin, polycarbonates, polyarylates polysulfones, polyether sulfones, etc. have come into widespread use as a material replacing metal because of their high strength and heat resistance, and as engineering plastics, their uses have been extended to machine component parts, automobile parts, electrical and electronic component parts, etc.

These engineering plastics have high strength and heat resistance, but due to their high melting temperatures and melt viscosities, they frequently require high molding temperatures and pressures in a molding process. Hence, there has been a strong demand for the improvement of their moldability.

General-purpose plastics are also required to have good flowability because articles of a large size, a small thickness or a complex shape as demanded.

When amorphous resins are heated above their glass transition temperature, such an abrupt decrease of viscosity as in crystalline resins does not occur, and their molding is frequently difficult as compared with the crystalline resins.

Methods for decreasing the intermolecular cohesive force of polymers have been generally used to improve the moldability of such amorphous thermoplastic resins. For example, the following techniques have been used.

(1) To reduce the polarity of a polymer, it is modified by, for example, copolymerizing a monomer having low polarity.

(2) The internal plasticization of a polymer is accelerated by providing branches in the polymer.

(3) The degree of polymerization of a polymer is reduced.

(4) A highly flowable polymer such as ethylene/vinylacetate copolymer (EVA) or low molecular weight polyethylene is added.

(5) A plasticizer is added.

These techniques have various problems still to be solved, and they constitute great technical problems in the art. For example, according to the techniques (1) and (2), the modification such as copolymerization frequently results in a deterioration in the inherent properties (such as heat resistance) of the resin to be modified. According to the techniques (3) and (4), the mechanical strength of the polymer is reduced in many cases. In the technique (5), the heat resistance of the polymer is sacrificed.

The present inventors extensively investigated additives which can improve moldability of amorphous thermoplastic resins while inhibiting a reduction in mechanical strength or heat resistance, and now have come to believe that such additives desirably have the following properties.

(1) They have good compatibility with the matrix component during molding in a flowable system, and produce the same flowability improving effect as plasticizers.

(2) During use, namely in a condition in which the flowing of a system is suspended (at temperatures below the Tg or crystallization temperature of the matrix), they separate from a phase of the matrix component to prevent reduction of the heat resistance of the matrix.

To prevent the reduction of mechanical strength, such additives should have an interfacial adhesion strength higher than a certain point with respect to the matrix despite their separation from the matrix phase, and thus have an affinity for the matrix.

The present inventors have continued their investigations in order to define more specifically compounds satisfying the requirements (1) and (2), and judged that compounds meeting the following requirements (a), (b) and (c) are suitable.

(a) Low molecular weight compounds which have a unit compatible with a matrix component so as to act as a plasticizer during molding in a flowing system.

(b) Compounds which separate from the matrix phase by crystallization at temperatures below the molding temperature (temperatures below the Tg or crystallizing temperature of the matrix).

(c) Compounds which have relatively strong polarity so that they securely crystallize at temperatures below the molding temperature, and which contains a unit having an affinity for the matrix component so as to retain an interfacial adhesion strength with respect to the matrix even when they have separated from the matrix phase upon crystallization.

Extensive investigations based on this analysis led to the discovery that specific diamide compounds are effective on polyphenylene ether resin. An invention based on this discovery was applied for patent (Japanese Patent Application No. 233289/82).

The present inventors have continued their investigations and have found that the addition of the above-described diamide compounds to various thermoplastic resins produces similar results to those obtained previously with regard to the polyphenylene ether resin. This discovery has led to the present invention.

SUMMARY OF THE INVENTION

Accordingly, an object of the present invention is to provide a means for improving moldability of thermosplastic resins.

Namely, the object of the present invention is to provide a thermoplastic resin composition having improved moldability comprising 100 parts by weight of an amorphous thermoplastic resin (excluding resins having polyphenylene ether as a main component), and 0.01 to 25 parts by weight of a diamide compound of the following formula

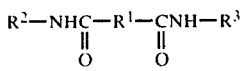
 (I)

wherein $R^1$ represents a linear or branched and saturated or unsaturated aliphatic hydrocarbon residue having 1 to 10 carbon atoms, an aromatic hydrocarbon residue having 6 to 10 carbon atoms, or a derivative thereof, and $R^2$ and $R^3$ which are the same or different each represents a linear or branched and saturated or unsaturated aliphatic hydrocarbon residue having 1 to 10 carbon atoms, an alicyclic hydrocarbon residue having 3 to 10 carbon atoms, an aromatic hydrocarbon radical having 6 to 10 carbon atoms, or a derivative thereof.

The amorphous thermoplastic resin is selected, for example, from styrene resins (such as polystyrene, high-impact polystyrene, AS resin and ABS resin), vinyl chloride resins, acrylic resins, polycarbonate resins, polynorbornene resins, polyarylate resins, polysulfone resins and polyether sulfone resins.

DETAILED DESCRIPTION OF THE INVENTION

Various amorphous thermoplastic resins can be used in the present invention.

In the present invention, the "amorphous thermoplastic resins" denote those amorphous thermoplastic polymers which have a crystallinity, determined by X-ray diffraction under normal use conditions, of 20% or less.

Examples of the amorphous thermoplastic resins which can be preferably used in the present invention include polystyrene, high impact polystyrene, styrene copolymers (such as ABS resin), polyvinyl chloride, polymethacrylic acid esters, polyacrylic acid derivatives, polycarbonates, polynorbornene resins, polyarylates, polysulfones and polyether sulfones, and modification products of these thermoplastic resins, such as styrene-grafted polycarbonate.

The present invention can also use blends (polymer alloys) of these thermoplastic resins with each other, for example, an alloy of polycarbonate and polystyrene, an alloy of ABS resin and a vinyl chloride polymer, and an alloy of polycarbonate and a vinyl chloride polymer.

The preferred amorphous thermoplastic resins used in the present invention have a glass transition point of at least 100° C., especially at least 120° C.

Homo- or copolymers of styrene, α-methylstyrene or halogenated styrene, or copolymers of these styrene monomers and vinyl monomers copolymerizable therewith may be used as the polystyrene-type resins. Modified polystyrene resins obtained by grafting these styrene monomers onto polymers such as polybutadiene can also be used.

Preferred polycarbonate resins are resins represented by the formula

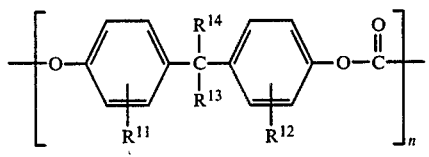

wherein $R^{11}$ and $R^{12}$ each represents hydrogen or an alkyl group having 1 to 8 carbon atoms, $R^{13}$ and $R^{14}$ each represents hydrogen, halogen or an alkyl group having 1 to 6 carbon atoms, and n is at least 20, preferably at least 50.

Preferred polynorbornene resins are resins represented by the formula

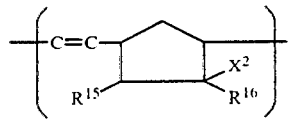

wherein $R^{15}$ and $R^{16}$ each represents hydrogen or a hydrocarbon residue having 1 to 20 carbon atoms, and $X^2$ represents a polar substituent, preferably —$(CH_2)_m COOR^{17}$, —$(CH_2)_m OCOR^{18}$, —$(CH_2)_m COOM$, —$(CH_2)_m CN$, —$(CH_2)_m CONR^{19}R^{20}$ or —$(CH_2)_m X$ in which m represents an integer of 0 to 17, $R^{17}$ to $R^{20}$ each represents a hydrocarbon residue having 1 to 20 carbon atoms, M represents hydrogen or an alkali metal or an alkaline earth metal, and X represents halogen.

Preferred polysulfone resins are resins represented by the formula

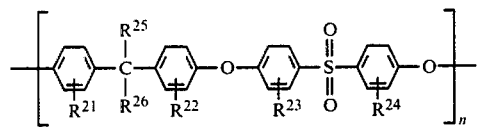

wherein $R^{21}$, $R^{22}$, $R^{23}$ and $R^{24}$ each represents hydrogen or a hydrocarbon residue having 1 to 8 carbon atoms, $R^{25}$ and $R^{26}$ each represents hydrogen, halogen or a hydrocarbon residue having 1 to 6 carbon atoms, and n is at least 30, preferably at least 60.

Preferred polyarylate resins are resins represented by the formula

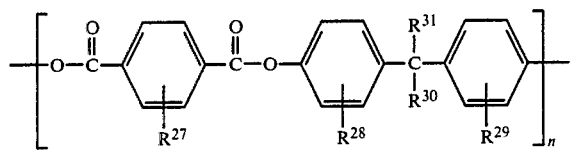

wherein $R^{27}$, $R^{28}$ and $R^{29}$ each represents hydrogen or a hydrocarbon residue having 1 to 8 carbon atoms, $R^{30}$ and $R^{31}$ each represents hydrogen, halogen or a hydrocarbon residue having 1 to 6 carbon atoms, and n is at least 30, preferably at least 60.

The diamide compounds which can be used in the present invention are compounds of the following formula:

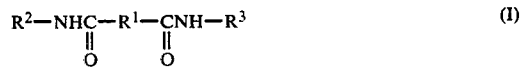
 (I)

wherein $R^1$ represents a linear or branched and saturated or unsaturated aliphatic hydrocarbon residue having 1 to 10 carbon atoms, an aromatic hydrocarbon residue having 6 to 10 carbon atoms, or a derivative thereof, and $R^2$ and $R^3$ which are the same or different each represents a linear or branched and saturated or unsaturated aliphatic hydrocarbon residue having 1 to 10 carbon atoms, an alicyclic hydrocarbon residue having 3 to 10 carbon atoms, an aromatic hydrocarbon residue having 6 to 10 carbon atoms, or a derivative thereof.

Examples of $R^1$ include methylene, ethylene, trimethylene, propylene, tetramethylene, isobutylene, pentamethylene, cyclohexylene, octamethylene, decamethylene and phenylene groups.

Examples of $R^2$ and $R^3$ include methyl, ethyl, propyl, isopropyl, butyl, isobutyl, t-butyl, pentyl, isopentyl, cyclopentyl, hexyl, isohexyl, cyclohexyl, heptyl, octyl, decyl, phenyl, tolyl and xylyl.

Each of $R^1$, $R^2$ and $R^3$ may have at least one substituent. Examples of such substituents are as follows:

—$R^4$: ($C_1$-$C_8$ hydrocarbon group)
—X: (halogen such as Cl, Br or F)
—$OR^5$: ($R^5$: H or $C_1$-$C_8$ hydrocarbon group)
—$NR^6R^7$: ($R^6$, $R^7$: H or $C_1$-$C_8$ hydrocarbon group)
—$OCOR^8$: ($R^8$: H or $C_1$-$C_8$ hydrocarbon group)
—COOH or its metal salt or acid anhydride,
—$SO_3H$,
—$NO_2$,
—NO,
—CN.

The diamide compounds which can be used in the present invention dissolve in the matrix component under a flowing condition during molding, and separates from a phase of the matrix component as a result of crystallization during use. Therefore, it is preferred for the diamide compounds to have a melting point slightly lower than the molding temperature.

The molding temperature is generally prescribed between the temperature at which the system begins to flow (the Tg of the matrix) as a lower limit and the temperature at which the system begins to decompose as an upper limit, and is adjusted to a suitable point depending upon the system to be molded. Accordingly, the desirable melting point of the diamide compound in accordance with the present invention (which is set at a temperature slightly lower than the molding temperature) is selected according to the molding temperature for the intended thermoplastic resins. Generally, it exists between 100° and 400° C.

The amount of the diamide compound added is 0.01 to 25 parts by weight, preferably 0.1 to 20 parts by weight, more preferably 0.5 to 10 parts by weight, per 100 parts by weight of the thermoplastic resin.

Various additives are used for the amorphous thermoplastic resins according to their purposes of use. For example, reinforcing agents (e.g., glass fibers and inorganic fillers), stabilizers, plasticizers, fire retardants, mold releasing agents, and coloring agents can be used.

The effect of improving moldability by the addition of the diamide compound in accordance with this invention is produced not only in the thermoplastic resin alone, but also in a mixture of the resin with the above-described various additives.

The amorphous thermoplastic resin, the diamide compound, the additives, etc. may be melt-kneaded by conventional methods, for example, by using a Banbury mixer, a kneader, or an extruder.

The present invention is explained in greater detail by reference to the following non-limiting examples and comparative examples.

EXAMPLE 1 AND COMPARATIVE EXAMPLE 1

100 Parts by weight of a high impact polystyrene ("HT-76", a trade name for a product of Mitsubishi Monsanto Co., Ltd.) and 5 parts by weight of N,N+-diphenyladipic diamide (melting point: 135° C.) of the following structural formula

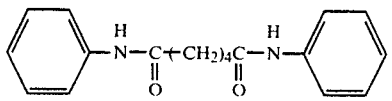

were melt-kneaded at 250° C. for 5 minutes using Brabender plastomill.

After kneading, the melt index (250° C., 5 kg load) of the mixture, as a measure of moldability (flowability), was measured. Furthermore, test pieces were formed from the mixture by a press, and their tensile modulus, strength at break and heat distortion temperature were measured.

The above procedure was repeated by imparting the same heat history without using N,N'-diphenyladipic diamide (Comparative Example 1).

The results obtained are shown in Table 1 below.

TABLE 1

| | Amount of N,N'—diphenyladipic diamide (parts by weight) | Melt index (*1) (g/10 min.) | Tensile modulus (kg/cm²) | Strength at break (kg/cm²) | distortion Temperature (°C.) |
| --- | --- | --- | --- | --- | --- |
| Example 1 | 5 | 73.5 | 27,000 | 240 | 83 |
| Comparative Example 1 | 0 | 33.0 | 26,000 | 230 | 85 |

(*1): Measured at 250° C. under a load of 5 kg.

The results of Table 1 demonstrate that the addition of N,N'-diphenyladipic diamide markedly increased the flowability (moldability) of the resin while inhibiting a reduction in mechanical strength and heat resistance.

EXAMPLE 2

Example 1 was repeated except that 5 parts by weight of N,N'-dihexyladipic diamide was used instead of N,N'-diphenyladipic diamide. The results obtained are shown in Table 2 below.

EXAMPLE 3

Example 1 was repeated except that 5 parts by weight of N,N'-dihexylterephthalic diamide was used instead of N,N'-diphenyladipic diamide. The results obtained are shown in Table 2 below.

EXAMPLE 4

Example 1 was repeated except that 5 parts by weight of N,N'-diphenylsuccinic diamide was used instead of N,N'-diphenyladipic diamide. The results obtained are shown in Table 2 below.

EXAMPLE 5

Example 1 was repeated except that 5 parts by weight of N,N'-dihexylsebacic diamide was used instead of N,N'-diphenyladipic diamide. The results obtained are shown in Table 2 below.

TABLE 2

| | Diamide Compound | | Melt index (*1) (g/10 min.) | Heat distortion Temperature (°C.) |
|---|---|---|---|---|
| | Type | Amount (parts by weight) | | |
| Example 2 | N,N'—dihexyladipic diamide | 5 | 81.5 | 83 |
| Example 3 | N,N'—dihexylterephthalic diamide | 5 | 83.5 | 82 |
| Example 4 | N,N'—diphenylsuccinic diamide | 5 | 69.6 | 83 |
| Example 5 | N,N'—dihexylsebacic diamide | 5 | 76.0 | 83 |
| Comparative Example 1 | None | 0 | 33.0 | 85 |

(*1): Same as the footnote to Table 1.

EXAMPLE 6 AND COMPARATIVE EXAMPLE 2

100 Parts by weight of ABS resin ("Cycolac LM1101", a trade name for a product of Ube Industries, Ltd.) and 5 parts by weight of N,N'-diphenyladipic diamide were melt-kneaded at 260° C. for 7.5 minutes by a Brabender plastomill.

After kneading, the same procedure as in Example 1 was repeated. The results obtained are shown in Table 3 below.

The above procedure was repeated except that the diamide compound was not used (Comparative Example 2). The results obtained are shown in Table 3 below.

EXAMPLE 7

Example 6 was repeated except that N,N'-dihexyladipic diamide was used instead of N,N'-diphenyladipic diamide. The results obtained are shown in Table 3 below.

TABLE 3

| | Diamide Compound | | Melt index (*1) (g/10 min.) | Tensile strength (kg/cm$^2$) | Heat distortion Temperature (°C.) |
|---|---|---|---|---|---|
| | Type | Amount (parts by weight) | | | |
| Example 6 | N,N'—diphenyladipic diamide | 5 | 10.9 | 330 | 81 |
| Example 7 | N,N'—dihexyladipic diamide | 5 | 12.6 | 310 | 82 |
| Comparative Example 2 | None | 0 | 2.8 | 310 | 84 |

(*1): Same as the footnote to Table 1.

EXAMPLES 8 AND 9 AND COMPARATIVE EXAMPLE 3

100 Parts by weight of polycarbonate resin ("Iupilon S-3000", a trade name for a product of Mitsubishi Gas Chemical Co., Ltd.) and a predetermined amount of N,N'-diphenyladipic diamide were melt-kneaded at 260° C. for 5 minutes using a Brabender plastomill. After kneading, the same procedure as in Example 1 was repeated. The results obtained are shown in Table 4 below.

The above procedure was repeated except that the diamide compound was not used (Comparative Example 3). The results obtained are shown in Table 4 below.

EXAMPLE 10

Example 8 was repeated except that N,N'-diphenylsuccinic diamide was used instead of N,N'-diphenyladipic diamide. The results are also shown in Table 4.

TABLE 4

| | Diamide Compound | | Melt index (*1) (g/10 min.) | Tensile strength (kg/cm$^2$) | Heat distortion Temperature (°C.) |
|---|---|---|---|---|---|
| | Type | Amount (parts by weight) | | | |
| Example 8 | N,N'—diphenyladipic diamide | 1 | 13.6 | 680 | 142 |
| Example 9 | N,N'—diphenyladipic diamide | 3 | 28.1 | 650 | 136 |
| Example 10 | N,N'—diphenylsuccinic diamide | 3 | 25.5 | 670 | 141 |
| Comparative Example 3 | None | 0 | 9.4 | 650 | 144 |

(*1): Same as the footnote to Table 1.

EXAMPLE 11 AND COMPARATIVE EXAMPLE 4

100 Parts by weight of a polymer alloy ("ARLOY 1100", a trade name for a product of ARCO Chemical Company) of polycarbonate and modified polystyrene and 5 parts by weight of N,N'-diphenyladipic diamide were melt-kneaded at 260° C. for 5 minutes using a Brabender plastomill. After kneading, the same procedure as in Example 1 was repeated.

The above procedure was repeated except that the diamide compound was not added (Comparative Example 4).

The results obtained are shown in Table 5 below.

EXAMPLE 12

Example 11 was repeated except that N,N'-dihexylterephthalic diamide was used instead of N,N'-diphenyladipic diamide.

The results obtained are shown in Table 5 below.

TABLE 5

| | Diamide Compound | | Melt | Tensile | Heat distortion |
|---|---|---|---|---|---|
| | Type | Amount (parts by weight) | index (*1) (g/10 min.) | strength (kg/cm$^2$) | Temperature (°C.) |
| Example 11 | N,N'—diphenyladipic diamide | 5 | 26.1 | 450 | 103 |
| Example 12 | N,N'—dihexylterephthalic diamide | 5 | 28.5 | 430 | 106 |
| Comparative Example 4 | None | 0 | 9.6 | 420 | 100 |

(*1): Same as the footnote to Table 1.

EXAMPLES 13 TO 15 AND COMPARATIVE EXAMPLE 5

100 Parts by weight of polyarylate resin ("U Polymer U-100", a trade name for a product of Unitika Ltd.) and a predetermined amount of N,N'-diphenyladipic diamide were melt-kneaded at 320° C. for 5 minutes using a Brabender plastomill. After kneading, the same procedure as in Example 1 repeated.

The above procedure was repeated except that N,N'-diphenylsuccinic diamide was used instead of N,N'-diphenyladipic diamide (Example 15).

The above procedure was repeated except that the diamide compound was not added (Comparative Example 5).

The results obtained are shown in Table 6 below.

TABLE 6

| | Diamide Compound | | Melt | Tensile | Heat distortion |
|---|---|---|---|---|---|
| | Type | Amount (parts by weight) | index (*2) (g/10 min.) | strength (kg/cm$^2$) | Temperature (°C.) |
| Example 13 | N,N'—diphenyladipic diamide | 1 | 12.8 | 730 | 167 |
| Example 14 | N,N'—diphenyladipic diamide | 3 | 28.5 | 720 | 160 |
| Example 15 | N,N'—diphenylsuccinic diamide | 1 | 10.7 | 730 | 166 |
| Comparative Example 5 | None | 0 | 3.6 | 710 | 169 |

(*2): Measured at 290° C. under a load of 20 kg.

EXAMPLES 16 AND 17 AND COMPARATIVE EXAMPLE 6

100 Parts by weight of polyether sulfone resin ("200 P", a trade name of a product of ICI) and a predetermined amount of N,N'-diphenyladipic diamide were melt-kneaded at 320° C. for 5 minutes using a Brabender plastomill. After kneading, the same procedure as in Example 1 was repeated.

The above procedure was repeated except that the diamide compound was not added (Comparative Example 6).

The results obtained are shown in Table 7 below.

EXAMPLE 18

Example 16 was repeated except that 3 parts by weight of N,N'-diphenylsuccinic diamide was used instead of N,N'-diphenyladipic diamide. The results obtained are shown in Table 7 below.

TABLE 7

| | Diamide Compound | | Melt | Tensile | Heat distortion |
|---|---|---|---|---|---|
| | Type | Amount (parts by weight) | index (*2) (g/10 min.) | strength (kg/cm$^2$) | Temperature (°C.) |
| Example 16 | N,N'—diphenyladipic diamide | 1 | 14.6 | 910 | 199 |
| Example 17 | N,N'—diphenyladipic diamide | 3 | 28.2 | 900 | 196 |
| Example 18 | N,N'—diphenylsuccinic diamide | 3 | 31.5 | 890 | 193 |
| Comparative Example 6 | None | 0 | 7.0 | 900 | 203 |

(*2): Same as the footnote to Table 6.

EXAMPLE 19 AND COMPARATIVE EXAMPLE 7

100 Parts by weight of polysulfonate resin ("NDEL P1700", a trade name of a product of Nissan Chemical Co., Ltd.) and 5 parts by weight of N,N'-diphenyladipic diamide were melt-kneaded at 320° C. for 5 minutes using a Brabender plastomill. After kneading, the same procedure as in Example 1 was repeated.

The above procedure was repeated except that the diamide compound was not used (Comparative Example 7).

The results obtained are shown in Table 8 below.

TABLE 8

| | Diamide Compound | | Melt index (*2) (g/10 min.) | Tensile strength (kg/cm$^2$) | Heat distortion Temperature (°C.) |
|---|---|---|---|---|---|
| | Type | Amount (parts by weight) | | | |
| Example 19 | N,N'—diphenyladipic diamide | 5 | 52.7 | 820 | 162 |
| Comparative Example 7 | None | 0 | 19.6 | 750 | 171 |

(*2): Same as the footnote to Table 6.

While the invention has been described in detail with reference to specific embodiments thereof, it will be apparent to one skilled in the art that various changes and modifications can be made therein without departing from the spirit and scope thereof.

What is claimed is:

1. A thermoplastic resin composition having improved moldability, comprising:
   (i) 100 parts by weight of an amorphous thermoplastic resins, excluding resins having polyphenylene ether as the main component, and which is at least one member selected from the group consisting of polystyrenes, polycarbonates, polynorbornene resins, polyarylates, polysulfones of the following formula:

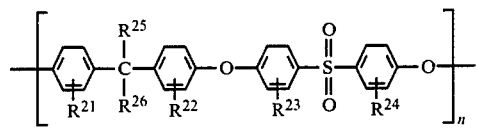

wherein $R^{21}$, $R^{22}$, $R^{23}$ and $R^{24}$ each independently represent a hydrogen atom or a hydrocarbon residue having 1 to 8 carbon atoms, $R^{25}$ and $R^{26}$ each independently represent a hydrogen atom, a halogen atom, or a hydrocarbon residue having 1 to 6 carbon atoms, and n is at least 30, and modification products obtained by graft-modification of these polymers, and
   (ii) 0.5 to 25 parts by weight of a diamide compound of the formula:

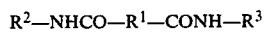

homogeneously blended with component (i), wherein $R^1$ is a linear or branched, saturated or unsaturated aliphatic hydrocarbon residue having 1 to 10 carbon atoms, an aromatic hydrocarbon residue having 6 to 10 carbon atoms, or a derivative thereof, and $R^2$ and $R^3$ which may be the same or different, each represent a linear or branched, saturated or unsaturated aliphatic hydrocarbon residue having 1 to 10 carbon atoms, a saturated or unsaturated alicyclic hydrocarbon residue having 3 to 10 carbon atoms, an aromatic hydrocarbon residue having 6 to 10 carbon atoms, or a derivative thereof.

2. The thermoplastic resin composition of claim 1, wherein n is at least 60.

3. The composition of claim 1, wherein the amount of the said diamide compound is 0.5 to 20 parts by weight.

4. The composition of claim 1, wherein the said diamide compound has a melting point of 100° to 400° C.

5. The composition of claim 1, wherein the said diamide compound contains an aromatic hydrocarbon residue for both $R^2$ and $R^3$, and has a melting point of 100° to 400° C.

6. The composition of claim 1, wherein the said amorphous thermoplastic resin has a glass transition temperature of at least 100° C.

7. The composition of claim 1, wherein the said amorphous thermoplastic resin has a glass transition temperature of at least 120° C.

8. The composition of claim 1, wherein the said amorphous thermoplastic resin is selected from the group consisting of ABS resins, polycarbonate resins, polyarylate resins, polyether sulfone resins, and blends thereof.

9. The composition of claim 8, wherein the amount of the said diamine compound is 0.5 to 20 parts by weight.

10. A thermoplastic resin composition, comprising a homogeneous blend of:
   (i) 100 parts by weight of an amorphous thermoplastic resin, excluding resins having polyphenylene ether as the main component, and having a crystallinity, determined by X-ray diffraction under normal use conditions, of 20% or less, said amorphous thermoplastic resin being at least one member selected from the group consisting of polystyrenes, polycarbonates, polynorbornene resins, polyarylates, polysulfones of the formula:

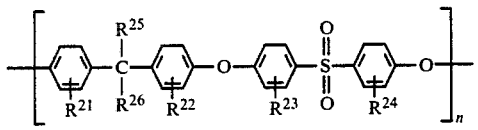

wherein $R^{21}$, $R^{22}$, $R^{23}$ and $R^{24}$ each represent a hydrogen atom or a hydrocarbon residue having 1 to 8 carbon atoms, $R^{25}$ and $R^{26}$ each represents a hydrogen atom, a halogen atom, or a hydrocarbon residue having 1 to 6 carbon atoms, and n is at least 30, and modification products obtained by graft-modifying these polymers, and
   (ii) 0.5 to 25 parts by weight of a diamide compound of the formula:

wherein $R^1$ is a linear or branched, saturated or unsaturated aliphatic hydrocarbon residue having 1 to 10 carbon atoms, an aromatic hydrocarbon residue having 6 to 10 carbon atoms, or a derivative thereof, and $R^2$ and $R^3$ which may be the same or different are each a linear or branched, saturated or unsaturated aliphatic hydrocarbon residue having 1 to 10 carbon atoms, a saturated or unsaturated alicyclic hydrocarbon residue having 3 to 10 carbon atoms, and an aromatic hydrocarbon residue having 6 to 10 carbon atoms, or a derivative thereof.

11. The thermoplastic resin composition of claim 10, wherein n is at least 60.

12. A method for improving the moldability of an amorphous thermoplastic resin, excluding resins having polyphenylene ether as the main component, comprising melt kneading (i) 100 parts by weight of an amorphous thermoplastic resin which is at least one member selected from the group consisting of polystyrenes, polycarbonates, polynorbornene resins, polyarylates, polysulfones represented by the formula:

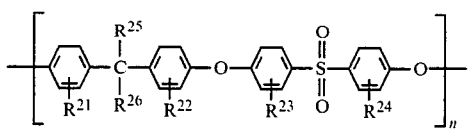

wherein $R^{21}$, $R^{22}$, $R^{23}$ and $R^{24}$ each represent a hydrogen atom or a hydrocarbon residue having 1 to 8 carbon atoms, $R^{25}$ and $R^{26}$ each represents a hydrogen atom, a halogen atom or a hydrocarbon residue having 1 to 6 carbon atoms, and n is at least 30, and modification product obtained by graft-modifying these polymers; and (ii) 0.5 to 25 parts by weight of a diamide compound of the formula:

$$R^2-NHCO-R^1-CONH-R^3$$

wherein $R^1$ is a linear or branched, saturated or unsaturated aliphatic hydrocarbon residue having 1 to 10 carbon atoms, an aromatic hydrocarbon residue having 6 to 10 carbon atoms, on a derivative thereof, and $R^2$ and $R^3$ which may be identical or different, are each a linear or branched, saturated or unsaturated aliphatic hydrocarbon residue having 1 to 10 carbon atoms, a saturated or unsaturated alicyclic hydrocarbon residue having 3 to 10 carbon atoms, an aromatic hydrocarbon residue having 6 to 10 carbon atoms, or a derivative thereof, to obtain a homogeneous blend.

13. The method of claim 12, comprising using as the said amorphous thermoplastic resin one of the said polysulfones where n is at least 60.

14. The method of claim 12, wherein the said amorphous resin has a crystallinity, determined by X-ray diffraction under normal use conditions, of 20% or less.

15. The thermoplastic resin composition of claim 1, wherein the said amorphous thermoplastic resin comprises a high impact polystyrene or a styrene copolymer.

16. The thermoplastic resin composition of claim 10, wherein the said amorphous thermoplastic resin comprises a high impact polystyrene or a styrene copolymer.

17. The method of claim 12, comprising using as the said amorphous thermoplastic resin a resin comprising a high impact polystyrene or a styrene copolymer.

* * * * *